Dec. 23, 1958
I. KIRSHENBAUM
2,865,844
HYDROFORMING PROCESS USING HIGH ACTIVITY CATALYSTS
CONTAINING SILICA AND CHROMIA
Filed May 28, 1953
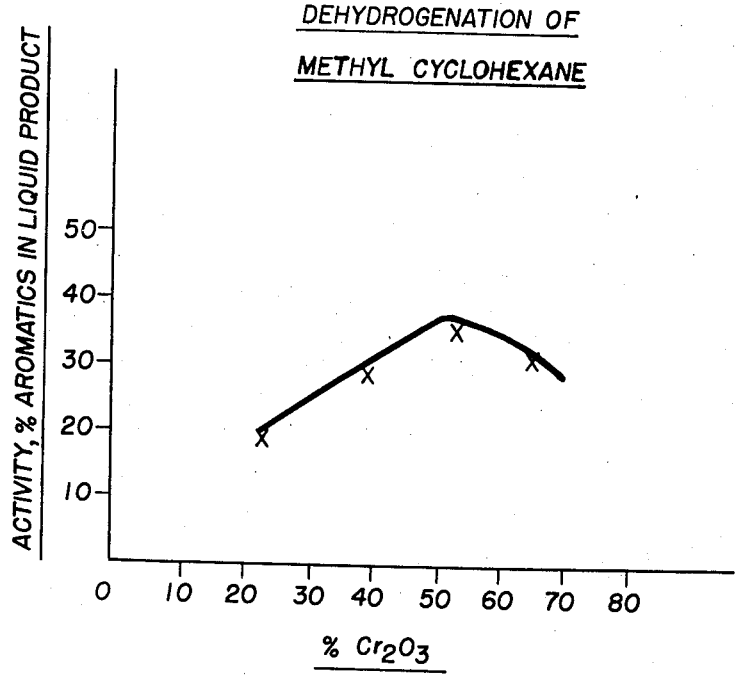
CATALYST ACTIVITY FOR 30 MINUTE RESIDENCE TIME
DEHYDROGENATION OF
METHYL CYCLOHEXANE
Isidor Kirshenbaum  Inventor
By J. Cashman Attorney

United States Patent Office 2,865,844
Patented Dec. 23, 1958

2,865,844

HYDROFORMING PROCESS USING HIGH ACTIVITY CATALYSTS CONTAINING SILICA AND CHROMIA

Isidor Kirshenbaum, Union, N. J., assignor to Esso Research and Engineering Company, a corporation of Delaware Application May 28, 1953, Serial No. 358,018

3 Claims. (Cl. 208—134)

This invention relates to the preparation of novel improved solid catalysts for the conversion of hydrocarbon materials. More particularly it relates to novel catalysts especially adapted for fluidized hydroforming operations containing large percentages of chromia admixed and/or combined with silica and preferably containing additional components.

Recent developments in the petroleum refining industry have concentrated attention upon methods for the conversion of low boiling feed stocks, particularly those in the middle and heavy portions of the naphtha boiling range, into products of improved octane number. Considerable success along these lines has been obtained by the process known as hydroforming. In this process the hydrocarbon feed stock is treated at operating temperatures of about 700°–1150° F., in the presence of a catalyst of suitable activity and in a hydrogen-containing atmosphere at such pressure that the hydrocarbon transformation reactions taking place result in a net production of hydrogen. A variety of reactions are involved, which include dehydrogenation, dealkylation, paraffin and naphthene isomerization, cyclization, or aromatization. All of these reactions together result in producing a product of markedly improved motor fuel value as determined by octane rating.

The operating conditions of the hydroforming process are pressures in the range of 0 to 3000 p. s. i. g., usually 100 to 700 p. s. i. g., and temperatures in the range of 700°–1150° F., usually 875°–1000° F. The hydrogen dilution can vary from about 1000 to 10,000 c. f./b.

The feed or charging stock to the hydroforming reactor can be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock.

Aromatics are produced from feed stocks rich in $C_6$+paraffins and naphthenes by aromatization. The operating conditions for these reactions include the reaction temperature range of 750°–1100° F., preferably 950°–1050° F., at pressures of 0 to 50 p. s. i. g. Subatmospheric pressures or superatmospheric pressures up to 150 p. s. i. g. or even higher may be used. Time of contact is not critical in that times of contact and temperature are essentially interchangeable over a wide range. The time of contact may vary with the feed rate of 0.1 to 10 v./v./hr. (volumes of liquid feed per volume of catalyst per hour), preferably from 0.2 to 2.0 v./v./hr.

A proper dilution of the hydrocarbon feed with hydrogen gas is important in obtaining high selectivity to aromatics and low selectivity to coke. The added hydrogen gas should be from 1 to 10 moles per mole of the hydrocarbon reactant. The hydrogen gas can be essentially pure or be a recycle gas containing 50–60% $H_2$. Hydrocarbons such as $CH_4$, $C_2H_6$ or even propane can be used in place of the hydrogen for feed stocks which do not form much coke.

Because of the large quantities of feed stocks that are processed in reactions such as hydroforming and aromatization, a good deal of research is expended in improving the product quality and distribution. These are represented by such factors as octane number, volatility, aromatics content, and selectivity of the desired product. This is particularly true in view of the ever increasing need for the production of aromatics.

Silica-chromia catalysts containing relatively small amounts of chromia have been utilized heretofore mainly in dehydrogenation of paraffins for the production of olefins and diolefins. Their activity as regards the dehydrogenation of naphthenes to aromatics and paraffins to aromatics is quite low. They therefore do not form very useful hydroforming or aromatizing catalysts.

It has now been found that improved silica-chromia hydroforming catalysts can be prepared utilizing the chromia concentration at a much higher concentration level than has been utilized heretofore. In addition, these two-component catalysts can preferably be further modified by the inclusion of other materials which further improve the activity substantially.

The weight percentages of the chromia and silica in two-component systems according to the present invention are in the ranges of about 45 to 60 weight percent chromia and 55 to 40 weight percent silica. Concentrations below and above these figures for chromia result in poorer performance.

These figures differ somewhat when additional hydrogenation-dehydrogenation catalyst components are utilized in the catalyst system, e. g., nickel oxide or sulfide, molybdenum oxide or sulfide, platinum, tungsten oxide or sulfide, etc., as explained in further detail below. When these additional components are utilized, the catalyst systems comprise about 20 to 60 weight percent chromia (chromium oxide, $Cr_2O_3$), preferably 20 to 50 weight percent; and from 80 to 40 weight percent silica, preferably 80 to 50 weight percent, both percentage figures on a two-component basis; and a mixture of two in turn admixed with from 0.1 to 30 weight percent, and preferably from 0.5 to 20 weight percent, third conversion component based on the total catalyst composition.

Experimental data show that the utilization of chromia in these relatively high proportions results in some chemical combination of chromia with silica, some chromia remaining uncombined. This chemical combination and physical admixture gives a superior two-component system. It is especially advantageous, however, when additional catalyst conversion components are utilized, as the activity and selectivity obtained are far in excess of that which is gotten from these additional components on silica alone. The initial silica-chromia two-component catalyst functions as a support for the additional components. The catalysts of this invention give higher yields of high octane number gasolines and higher yields of liquid products rich in aromatics.

These catalysts can be prepared in a manner known to those skilled in the art. For example, in order to prepare the chromia-silica catalyst, silica hydrosol or hydrogel is impregnated with a water-soluble chromium compound such as $CrO_3$ or a chromate or a chromium compound decomposable to the oxides by heat. Typical compounds are chromium acetate, chromium nitrate, ammonium chromate or dichromate, etc. The chromium compound can also be incorporated by mulling the gel or hydrogel with a compound such as chromium oxalate, chromium carbonate, $Cr_2O_3$, etc. The impregnated mass is dried, heated, pilled, and heated to an elevated temperature, i.e., 850°–1200° F., for about three hours or longer in the presence of air or nitrogen. Other ways of preparing the two-component catalyst comprise impregnating a silica sol with chromium trioxide or other soluble chromate in a water solution, drying and calcining at an elevated temperature, i. e., 400°–1200° F., in air, hydrogen, or nitrogen. Another method of preparing the catalyst is to impregnate silica gel or hydrogel with chromium nitrate solution, dry at a low temperature of about 250° F., and then re-wet the mass with an ammonium hydroxide solution to produce chromium hydroxide. This product is heated to 250°–400° F., and then calcined at temperatures of 850°–1200° F. The catalyst also can be produced by mulling together silica gel with chromium oxide gel in the proper proportions and drying and calcining as specified above. Good catalysts can be made by admixing silica and chromia sols causing gelation by methods known to those skilled in the art, and drying and calcining. Especially good catalysts are made by coprecipitating the silica-chromia combinations by admixing aqueous solutions of sodium silicate and chromium acetate to give an acid hydrosol which may be gelled by aging and by addition of ammonium hydroxide. A coprecipitated catalyst may be made also by adding silicon tetrachloride to an aqueous solution of a trivalent chromium compound such as the nitrate or acetate and adjusting the pH with ammonium hydroxide. The appropriate amount of ethyl silicate is admixed with an aqueous solution of $CrO_3$ and is heated or aged to give a gel containing the hydrous oxides.

A silica sol, obtained by passing a sodium silicate solution over a base exchange resin, can be admixed with a solution of chromic oxide, dried and calcined to give a silicon-chromium oxide catalyst.

The third hydrogenation-dehydrogenation catalyst component utilized advantageously with the silica chromia catalyst system of this invention includes materials such as $NiO$, $MoO_3$, $CoMoO_4$, platinum, palladium, nickel chromate, and other hydrocarbon dehydrogenation and hydroforming conversion catalyst components. Other additives include the oxides or sulfides of group VIB and group VIII metals. These added components can be added to the calcined two-component system which is utilized in effect as a base for the third component by conventional simple impregnation or by multiple impregnation from aqueous and other solutions as well as by mixing the base with sols, gels, or precipitated oxides or sulfides of these various components.

Thee amount of these added third components varies with the particular ingredient; for example, nickel oxide is preferably employed in an amount of 1 to 5 weight percent based on the total catalyst system, $MoO_3$ in an amount of about 5 to 20 weight percent, cobalt molybdate in an amount of about from 10 to 30 weight percent, and platinum in an amount of about 0.1 to 5 weight percent.

The three-component catalyst is activated by calcination in the temperature range of 750°–1400° F., preferably 850°–1200° F. However, the platinum-containing catalysts can be activated to advantage by low temperature drying at 250°–400° F., followed by a relatively low temperature reduction in hydrogen in the temperature range of 750°–950° F. In the three-component systems it is not necessary to utilize an initial activation of the initial chromia-silica combination, but it is desirable.

In addition to these other components, various promoters can be utilized, such as, for example, 0.1 to 5% of alkaline earth promoter such as the oxides, carbonates, acetates, oxalates, or chromates of zinc, magnesium or calcium. Only trace amounts of alkali promoters should be used if activity loss is to be avoided. Concentrations in the range equivalent to 0.01 to 0.2% $K_2O$ or $Li_2O$ are recommended. The activity of these catalysts can also be modified to advantage by the addition of 1 to 10% alumina, or by 0.1 to 3% hydrogen fluoride, ammonium fluoride, or calcium fluoride, which increase the hydrocracking or isomerization activity. Small amounts (0.5–10%) of aluminum phosphate, zirconium phosphate, silicon phosphate, titanium phosphate, ammonium phosphate, etc., may also be added to improve the catalysts of this invention, especially in regard to catalyst stability. Other promoters which can be added to improve catalyst performance include 1–20% $TiO_2$ or $ZrO_2$, all weight percent based on total catalyst. Other promoters include 0.05–1% cerium oxide and 0.5–5% beryllium oxide.

This invention will be better understood by reference to the following examples of the preparation of the catalysts of this invention and their utilization and advantages in hydroforming and aromatization systems.

*Example I.—Preparation of silica-chromia catalyst*

A silica gel was prepared by adding a sodium silicate solution to dilute sulfuric acid. The hydrous oxide mass was washed substantially free of sodium and sulfate ions and dried overnight at 400° F. A 400 gram portion of the dried gel was impregnated with $CrO_3$ using concentrated solutions of $CrO_3$ in water. The dried gel was first impregnated with 320 cc. of solution, containing 147 grams of $CrO_3$, dried at 400° F. overnight and then reimpregnated with a solution containing 163 grams of $CrO_3$. After drying and a third impregnation the preparation was again dried at 400° F. overnight and calcined at 1200° F. to give a catalyst containing about 47% $SiO_2$ and 53% $Cr_2O_3$.

*Example II*

A 389 gram portion of hydrous silica gel, prepared as in Example I, was dried at 250°–400° F. and impregnated with 147 grams of $CrO_3$ in enough water to just wet the gel. The preparation was dried overnight at 400° F. and calcined 3 hours at 1200° F. A 360 gram portion of the dried base was impregnated with 47.5 grams of ammonium molybdate (containing 40 grams of $MoO_3$) dissolved in 140 cc. of water. The resultant mass was dried and calcined to give a catalyst having the nominal composition $90[77.6SiO_2—22.4Cr_2O_3]—10MoO_3$.

*Example III*

A 190 gram portion of a silica-chromia preparation similar to that used in Example II was impregnated with 200 cc. of an ammoniacal solution of nickel nitrate containing the equivalent of 50 grams NiO per liter of solution. After drying at 400° F. and calcining 3 hours at 1200° F., the nominal composition was

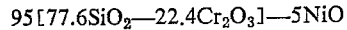

$95[77.6SiO_2—22.4Cr_2O_3]—5NiO$

*Example IV*

Using the above described multiple impregnation technique, a silica-chromia catalyst base having the nominal composition $60.4SiO_2—39.6Cr_2O_3$ was prepared. After calcination at 1200° F. the base was impregnated with an aqueous solution of platinum chloride containing 0.0111 gram Pt per cc. of solution. The catalyst was dried at room temperature and at 250° F. overnight, and then reduced in a stream of hydrogen overnight, slowly raising the temperature to 900° F. in about 8 hours. The final catalyst had the nominal composition

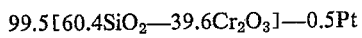

$99.5[60.4SiO_2—39.6Cr_2O_3]—0.5Pt$

*Example V*

The silica-chromia catalyst of Example I containing 53 weight percent chromia and 47 weight percent silica was tested as an aromatization catalyst in the aromatization of methylcyclohexane at atmospheric pressure in the presence of 2 moles of hydrogen per mole of feed in a vapor phase reaction at a temperature of about 900° F. The volume percent of aromatics in the liquid product was 57 volume percent.

For comparison purposes a conventional two-component silica-chromia catalyst was used in a similar aromatization reaction. This catalyst consisted of 10 weight percent chromia and 90 weight percent silica. The aromatization reaction was carried out with the same reactant in the same manner and gave a volume percent of aromatics in the liquid product of only 16%. These figures show how more than 3½ times as much aromatics was produced from the two-component catalyst of this invention utilizing a higher concentration of chromia.

*Example VI*

A series of tests was run to determine the effect of varying chromia concentrations in the chromia-silica catalyst. The data are presented in the graph in the drawing for a thirty-minute catalyst residence time in the reactor wherein methylcyclohexane was dehydrogenated to toluene in a manner similar to that in the preceding example, Example V. This graph shows how the maximum activity in terms of volume percent aromatics in liquid product was obtained with a chromia concentration in the range of about 45 to 60 weight percent. Concentrations below and above this figure resulted in decreased yield of aromatics.

Other data show that catalysts containing more than about 60 weight percent chromia deactivate on stream more rapidly than do the catalysts of the preferred composition. This apparently accounts for the diminished activity.

*Example VII*

Methylcyclohexane was hydroformed at 975° F., at 200 p. s. i. g., 2.5 to 1.0 hydrogen/hydrocarbon ratio with various catalyst systems as detailed in the table below.

lar experiment a catalyst containing $48SiO_2$—$52Cr_2O_3$ gaves an aromatics yield of 45% illustrative of the aromatization of aliphatics.

The catalyst composition may be formed into pills, pellets or other shaped bodies either before or after calcination and with or without the use of pilling aids such as graphite, starch, solid hydrogenated vegetable oil or fat, etc. In the event that the catalyst is to be utilized in a reactor system involving the fluidized solids technique, the catalyst composition should be ground or prepared in such a way that the particles are below 300–500 microns and preferably are within the range of 10 to 200 microns with a major proportion of the particles in the 20 to 80 micron range.

The catalyst compositions in accordance with the present invention may be used for the reforming of hydrocarbon mixtures or separate hydrocarbon concentrations, such as naphthenic fractions rich in aliphatic, alicyclic or hydroaromatic hydrocarbons including cyclohexane and its homologues such as methyl cyclohexane, dimethyl cyclohexane, ethyl cyclohexane, methyl ethyl cyclohexane and the like, as well as homologues of methylcyclopentane.

It is to be understood that this invention is not limited to the specific examples, which have been offered merely as illustrations, and that modifications may be made without departing from the spirit of the invention.

| Base | 77.6 $SiO_2$—22.4 $Cr_2O_3$ | | | | | | 60 $SiO_2$—40 $Cr_2O_3$ | | |
|---|---|---|---|---|---|---|---|---|---|
| Additive | None | NiO | 5% CuO 0.5% NiO | 10% CuO 1.0% NiO | $MoO_3$ | $CoMoO_4$ | None | NiO | $MoO_3$ |
| Wt. Percent | 0 | 1 | 5 | 10 | 5.5 | 11 | 5 | 10 | 20 | 20 | 0 | 1 | 5 | *10 | 5 | 10 |
| Vol. Percent Aromatics in Liquid Product | 49 | 57 | 50 | 31 | 68 | 66 | 59 | 73 | 72 | 68 | 59 | 69 | 63 | 18 | 59 | 60 |

| Base | 47 $SiO_2$—53 $Cr_2O_3$ | | | | $SiO_2$ | | 50 $SiO_2$—50 $MoO_3$ | $Al_2O_3$ | | |
|---|---|---|---|---|---|---|---|---|---|---|
| Additive | None | $MoO_3$ | NiO | | | NiO | $MoO_3$ | NiO | None | $Cr_2O_3$** | NiO |
| Wt. Percent | 0 | 5 | 10 | 1 | 5 | *10 | 5 | 10 | 40 | 1 | 5 | 0 | 22 | 3 | 6 |
| Vol. Percent Aromatics in Liquid Product | 47 | 52 | 66 | 63 | 60 | 34 | 56 | 12 | 19 | 38 | 28 | 33 | 23 | *62 | *68 |

*Excessive cracking of liquid feed with low liquid recovery.
**Promoted with about 1% $K_2O$.

These data establish several facts. The utilization of the added hydrocarbon conversion catalyst component even further increases the yield of product obtained. Exceeding the preferred concentration of the third component, however, e. g., NiO, reduces the yield. The performance of known hydrocarbon conversion catalysts, e. g., $MoO_3$, NiO and $Cr_2O_3$, was far superior on the combined support material of this invention to that on conventional supports such as silica and alumina. In addition, NiO on alumina support resulted in excessive cracking and lower yields.

*Example VIII*

A portion of the catalyst of Example I was reimpregnated with an ammoniacal solution of ammonium molybdate to give a catalyst having the composition $$90[52SiO_2—48Cr_2O_3]—10MoO_3$$

The catalyst is used to reform a 220°—330° F. virgin naphtha containing naphthenes and paraffins, which is upgraded thereby from 51 Research octane number to an 84 Research octane number clear. This reforming operation is carried out at 925° F. and 200 p. s. i. g. in the presence of 3000 cubic feet of hydrogen per barrel of liquid feed.

*Example IX*

A 77.6 $SiO_2$—22.4 $Cr_2O_3$ catalyst is used to aromatize n-heptane at 1000° F., 0 p. s. i. g., and 2/1 $H_2$/n-$C_7$ mole ratio. The liquid product is 27% aromatics. In a simi-

What is claimed is:

1. A process for the catalytic hydroforming of hydrocarbon fractions which comprises contacting such a hydrocarbon fraction in a hydroforming zone maintained between about 700° F. and 1150° F. and at a pressure between about 0 and 3000 p. s. i. g. and with about 1000 to 10,000 cubic feet per barrel of hydrogen present with a catalyst composition which consists essentially of 10 weight percent $MoO_3$ on a silica-chromia support, the support consisting essentially of 52 weight percent silica and 48 weight percent chromia.

2. A catalyst composition for converting hydrocarbons consisting essentially of 10 weight percent $MoO_3$ on a silica-chromia supporting agent, the supporting agent consisting essentially of 77.6 weight percent silica and 22.4 weight percent chromia.

3. A catalyst composition for converting hydrocarbons which comprises from about 0.1 to 30 weight percent $MoO_3$ on a silica-chromia support, said support containing about 20 to 60 weight percent chromia and about 40 to 80 weight percent silica.

References Cited in the file of this patent

UNITED STATES PATENTS

| 2,339,349 | Morey | Jan. 18, 1944 |
| 2,470,166 | Hetzel | May 17, 1949 |
| 2,635,123 | Kennedy | Apr. 14, 1953 |
| 2,645,619 | Hoekstra | July 14, 1953 |